US011724466B2

(12) United States Patent
Huoponen et al.

(10) Patent No.: US 11,724,466 B2
(45) Date of Patent: Aug. 15, 2023

(54) STITCHED MULTI-AXIAL REINFORCEMENT AND A METHOD OF PRODUCING THE SAME

(71) Applicant: VITRULAN COMPOSITES OY, Mikkeli (FI)

(72) Inventors: Petro Huoponen, Mikkeli (FI); Maija Fjällström, Mikkeli (FI)

(73) Assignee: VITRULAN COMPOSITES OY, Mikkeli (FI)

( * ) Notice: Subject to any disclaimer, the term of this patent is extended or adjusted under 35 U.S.C. 154(b) by 477 days.

(21) Appl. No.: 16/971,845

(22) PCT Filed: Feb. 26, 2018

(86) PCT No.: PCT/EP2018/054638
§ 371 (c)(1),
(2) Date: Aug. 21, 2020

(87) PCT Pub. No.: WO2019/161926
PCT Pub. Date: Aug. 29, 2019

(65) Prior Publication Data
US 2021/0008815 A1    Jan. 14, 2021

(51) Int. Cl.
*B29C 70/24* (2006.01)
*B32B 5/08* (2006.01)
(Continued)

(52) U.S. Cl.
CPC ............ *B29C 70/24* (2013.01); *B29C 70/543* (2013.01); *B29C 70/202* (2013.01);
(Continued)

(58) Field of Classification Search
CPC .......... B29C 70/24; B29C 70/202; B32B 5/08
See application file for complete search history.

(56) References Cited

U.S. PATENT DOCUMENTS

| 4,677,831 A | 7/1987 | Wunner |
| 5,490,602 A * | 2/1996 | Wilson .................... B29C 70/24 |
| | | 428/116 |

(Continued)

FOREIGN PATENT DOCUMENTS

| DK | 2918398 T3 | 8/2017 |
| EP | 1 174 533 | 1/2002 |

(Continued)

OTHER PUBLICATIONS

International Preliminary Report on Patentability for PCT/EP2018/054638 dated Jun. 29, 2020, 57 pages.
(Continued)

*Primary Examiner* — Long T Tran
(74) *Attorney, Agent, or Firm* — Nixon & Vanderhye P.C.

(57) ABSTRACT

A stitched multi-axial reinforcement and a method of producing a stitched multi-axial reinforcement. The stitched multi-axial reinforcement (40) may be used in applications where high quality and strength is required. The stitched multi-axial reinforcement includes at least two sets of mono- or bonded multifilaments arranged transverse to one another between reinforcing layers for ensuring good resin flow properties in directions transverse to the direction of the unidirectional rovings (20', 32').

22 Claims, 3 Drawing Sheets

(51) Int. Cl.
*B29C 70/54* (2006.01)
*B29C 70/20* (2006.01)
*B29K 101/12* (2006.01)
*B29L 31/08* (2006.01)

(52) U.S. Cl.
CPC ..... *B29K 2101/12* (2013.01); *B29L 2031/085* (2013.01); *B32B 5/08* (2013.01); *B32B 2260/046* (2013.01); *B32B 2262/101* (2013.01)

(56) References Cited

U.S. PATENT DOCUMENTS

| | | | | |
|---|---|---|---|---|
| 7,358,202 | B2* | 4/2008 | Hartman | B32B 5/024 442/247 |
| 10,322,530 | B2* | 6/2019 | Kawabe | B29C 43/20 |
| 2002/0123287 | A1* | 9/2002 | Davies | D04H 3/11 442/364 |
| 2005/0037678 | A1 | 2/2005 | Mack et al. | |
| 2015/0183184 | A1* | 7/2015 | Bergstrom | B32B 38/00 112/440 |
| 2016/0288429 | A1* | 10/2016 | Bergstrom | B29B 11/16 |
| 2017/0314894 | A1* | 11/2017 | Tunis, III | B32B 5/026 |
| 2017/0334791 | A1* | 11/2017 | Podgorski | C04B 35/185 |
| 2020/0011184 | A1* | 1/2020 | Boeck | F01D 5/284 |

FOREIGN PATENT DOCUMENTS

| | | |
|---|---|---|
| EP | 2874803 | 5/2015 |
| WO | 2008/147393 | 12/2008 |

OTHER PUBLICATIONS

International Search Report and Written Opinion of the ISA for PCT/EP2018/054638 dated Nov. 29, 2018, 15 pages.
Written Opinion of the International Preliminary Examining Authority for PCT/EP2018/054638 dated Feb. 10, 2020, 9 pages.

* cited by examiner

STITCHED MULTI-AXIAL REINFORCEMENT AND A METHOD OF PRODUCING THE SAME

RELATED APPLICATION

This application is the U.S. national phase of International Application PCT/EP2018/054638 filed Feb. 26, 2018, which designated the U.S., the entire contents of which is incorporated by reference.

TECHNICAL FIELD

The present invention relates to a stitched multi-axial reinforcement and a method of producing a stitched multi-axial reinforcement. The stitched multi-axial reinforcement of the present invention may be used in all such applications that reinforcements are generally needed and especially in such applications where either Vacuum Infusion technology or Resin Transfer Molding (RTM) technology for distributing the resin in the mold is used. The stitched multi-axial reinforcement of the present invention is especially applicable in the manufacture of wind turbine blades, boats, sporting equipment, storage tanks, bus, trailer, train and truck panels, etc., and generally in all such structures that are subjected to stress in more than one direction.

BACKGROUND ART

When manufacturing composite and laminate products using various fibers, like for instance glass, carbon and aramid fibers as well as flax, hemp, jute, kenaf, basalt and other natural fibers etc. for the manufacture of, for instance, boat, automotive, bus, train, trailer and truck panels or wind turbine parts, for example, the manufacture starts with the production of an appropriate fiber reinforcement like woven or knitted structure which may have a unidirectional or multi-axial orientation. The structures are, then, placed in a mold used in the manufacture of the intermediate or end product. The mold has, naturally, the shape of the end product meaning that the shape may sometimes be very complicated, and require substantial shaping of the reinforcement when placed in the mold. Normally several layers, up to tens of layers, of reinforcements are placed one on top of another in the mold and a thermosetting resin like epoxy mixed with hardener or unsaturated polyester resin or vinyl ester resin is introduced in the mold for forming a fiber-reinforced composite article. Resin may also be thermoplastic like PA (polyamide) or CBT (Cyclic Polybutylene Terephthalate) or alike. Practice has shown that when the end product has to resist high mechanical loads, unidirectional layers of reinforcing rovings, which may be held together by means of stitching, are a preferred choice in its manufacture. In such a case that there are mechanical loads in more than one direction, multi-axial reinforcements are a preferred choice. Such unidirectional layers of a reinforcement are made of rovings or tows, generally called reinforcing fibers.

Multi-axial reinforcement is formed of two or more layers of reinforcing rovings, where the rovings in one layer are unidirectional but rovings of adjacent layers form a certain angle, usually 45, 60 or 90 degrees, though other roving orientations may as well be used. The construction of the reinforcement depends on the target areal weight and the tex number of the rovings. For instance if a high areal weight or gram weight is desired, a thick roving (for example with E-glass 2400 tex) is used, and where a reinforcement with low areal weight is desired, a thin roving (for example with E-glass 600 tex) is used in its manufacture.

The end product, i.e. cured laminate structure may be made of a number of such multi-axial reinforcements by arranging the layers of reinforcements such that, in the end product, the rovings of the layers are oriented in at least two different directions according to loads the laminate construction is subjected to or by first manufacturing fabrics of several layers of unidirectional reinforcements so that the rovings of adjacent layers form a certain angle, and thereafter using the fabrics thus formed in the production of the end product. Such fabrics are called biaxial, triaxial, quadraxial etc. fabrics depending on the number of different fiber orientations therein.

A multi-axial reinforcement formed of at least two reinforcing layers of in itself unidirectional reinforcing rovings is inherently unstable by nature as yarns of each reinforcing layer run in one direction only. In order to be able to handle such a reinforcement, its rovings have to be anchored or bonded to each other in a suitable manner. Prior art knows, in principle, two different mechanical methods for such a purpose.

One method is to secure the rovings by means of stitching (e.g. warp knitting). The stitching yarns form knitting loops, i.e. stitches, which are holding the actual reinforcing rovings, in their place in the reinforcement. The stitches are formed by various knitting elements, e.g. by needles, which penetrate the layer or layers of reinforcing rovings according to the known warp knitting technique. The stitches may form several well-known patterns like for instance chain or tricot etc. The stitching yarn is typically, but not necessarily, texturized or non-texturized polyester (polyethylene terephthalate) filament yarn having a thickness from about 34 dtex to about 167 dtex and comprising tens of filaments, normally e.g. 24 or 48 filaments.

Another mechanical method is to use weaving technique to anchor the longitudinal warp yarns, i.e. reinforcing rovings, with light weight weft yarns in their respective place. As weft yarns both non-coated and hot-melt coated yarns have been used. After heating and cooling the hot melt binder has given the reinforcement considerable stability. Yet the weaving alternative is not any more considered favorable as the reinforcing rovings form kinks when crossing over the weft yarns leading to stress concentrations and lower mechanical properties than stitched versions. The hot melt binder yarns have been found to create local disturbance in matrix curing and are not either favored any more in the trade. Typically, the weft yarns are multifilament yarns that get flat under compression irrespective of their being hot-melt yarns or not.

Stitched reinforcements are well known and they have a few good properties. Firstly, their transverse stability is good because the stitching yarns although running mainly longitudinally form such patterns, like tricot, that give the unidirectional rovings the structural integrity needed for the reinforcement. Secondly, the reinforcement is easy to position in the mold (i.e. allow the reinforcement to follow the contours of the mold) as the stitched reinforcement is often very flexible if stitching parameters are properly chosen like stitch length, needle gauge and yarn tension, just to name a few as an example.

The use of stitches, however, can result in a problem, too. The problem may be seen when infusing a stack of stitched reinforcements, i.e. so called preform, with resin. The resin distribution in fiber bundles is surprisingly slow and uneven in both directions, i.e. in a direction parallel with the reinforcing rovings and in a direction transverse to the reinforcing rovings. The above finding is surprising as at a first glance a stitched reinforcement seems to include flow passages in three dimensions. The stitches when tightened around a bundle of rovings open flow passages through the reinforcement. Also in the direction of the stitch yarns parallel with the surface of the reinforcement the rovings are pressed together such that flow passages on the surface of the reinforcement are created. And also in the direction of the rovings the tightening of the stitches would appear to form longitudinal flow passages on the surface of the reinforcement. It could be expected that, when a reinforcement is placed on top of another in the mold, the stack of reinforcements would include a three-dimensional network of flow passages, which would ensure a rapid resin flow and penetration as well as quick wet-out of the stack of reinforcements. However, as already mentioned above, that is not the case. The main reason is that before the resin feed to the mold is initiated the stack of reinforcements in the mold is subjected to compression. The compression makes the reinforcements to be pressed against one another by such a force that, as the stitches of the reinforcements are not vertically one directly above another but their positioning is random, the "free" rovings (meaning rovings, which are not under compression by a stitch) between the stitches of one reinforcement are pressed on the stitch of a neighboring reinforcement. As a result the flow passage in the direction of the surface of the reinforcement is more or less totally filled with the "free" rovings preventing efficient resin flow in the direction of the surface of a reinforcement. As to the part of a stitch where the stitching yarn is in the Z-direction the flow passage remains in the stack, maybe somewhat smaller, but still. However, now that the flow passages in the direction of the surface of a reinforcement are substantially closed, the flow passage in the Z-direction remains filled with air, which is very hard to remove. This easily results in the presence of gas bubbles in the end product, which, naturally, reduces the quality and strength properties of the end product.

As good resin permeability is vital for the practical execution of the molding process it is normally speeded up by utilizing pressure difference when feeding resin in the mold. It is common practice to apply either Vacuum Infusion technology or Resin Transfer Molding (RTM) technology for distributing the resin all over the reinforcement layers in the mold. However, sometimes despite various measures, like vacuum and/or raised feed pressure, small air cavities tend to remain in the reinforcement reducing significantly the strength properties of the laminate. The main reason for the air cavities is the tight positioning of the rovings against each other in the reinforcement such that its permeability to resin is in both transverse and longitudinal directions of the reinforcement rovings as well as in Z-direction limited. In view of the above, new ways to improve both the removal of gas from the stack of reinforcements and the permeability of the reinforcement to resin should be investigated.

One way to improve the permeability of the reinforcement is to provide the reinforcement with flow passages for resin, the flow passages allowing the resin to flow quickly in the reinforcement. There may be found, in prior art, numerous ways for arranging the resin flow passages in the reinforcements or between the reinforcements in a stack of reinforcements, for instance so called infusion fabrics. However, it has been learned that the use of such flow passages is not very efficient, as the vacuum applied in the infusion stage tends to shift or draw rovings from the neighboring areas or reinforcements and even shift their positions to fill the flow passages/cavities.

A traditional way of arranging resin flow channels in a reinforcement is discussed in US-A-2005/0037678. The document discloses an open grid fabric, which is formed of thick unidirectional rovings which are stitched to one another so that such a mat of unidirectional rovings is formed that a clear open space is left between adjacent parallel rovings. Another optional structure is to form the grid fabric of two layers of rovings where the rovings of one layer are arranged at right angles to those of the other layer. The rovings are again stitched to one another such that an open grid fabric is formed. The open grid fabric of the US-application is used as an infusion fabric by placing such between reinforcing layers of a laminate to ensure unobstructed resin flow between the reinforcing layers to wet out the neighboring reinforcing layers in the Z-direction. The problems in the construction of the US-application relate to the open grid fabric being a separately manufactured product, and to the rovings used in the fabric. The separate manufacturing step adds to the manufacturing costs of a reinforcement, and the use of rovings, which are not bonded or twisted, means that in order to provide some open space in the open grid fabric, the rovings have to be very thick (see the discussion in connection with FIG. 1b relating to a roving flattening under compression). The thick rovings equal to increase in both weight and expenses in such parts of the product that are needed only in a secondary purpose, i.e. resin flow. The relatively high proportion of rovings in a direction that is not needed in view of the strength and fatigue aspects of the product make the product neither commercially nor market-wise attractive. A further downside of this kind of an infusion fabric is that it causes, in the end product, areas of higher resin content than in the parts containing only reinforcing layers, i.e. the product is not cohesive.

Prior art knows also biaxial infusion fabrics that are manufactured of two in itself woven layers of rovings, which are first stretched in diagonal direction such that one layer is turned into a −45 degrees layer and another into a +45 degrees layer, and thereafter stitched together. Both woven layers comprise thick glass fiber rovings in weft direction and thin glass fiber yarns in warp direction. The warp direction yarns bind the rovings in relatively loose round bundles. When the woven layers are skewed the warp direction yarns tighten, and bind the rovings tighter (equals to a closer-to-round cross section of the bundles) together. As a good example of the yarn tightness may be mentioned that longitudinal weft yarns may be turned, by skewing, 30 and 45 degrees from the weft direction but not anymore 60 degrees. The two woven and stretched layers are, then, placed one above the other such that the rovings of the layers run in different orientations, whereby, after stitching, a biaxial product is resulted. The product is sold for use as an infusion fabric, which has resin flow channels in the direction of the rovings.

However, the above infusion fabric has a few problems in its structure, use and operation. In practice, in this kind of products there is a clear correlation between the resin flow capability and the gram weight such that the higher is the gram weight the worse is the flow capability (unless the tex-number of the rovings is changed). The reason is that the flow passages in the product are formed between the rovings and when increasing the gram weight the number of rovings is increased, whereby the open area between the rovings is, naturally, reduced. Another option would be to increase the size or tex-number of the rovings, but, as the roving are available in only 300 tex, 600 tex, 1200 tex, 2400 tex, 4800 tex etc. it is not nearly always possible to find a good match.

Many times a step from one roving size resulting in a less adequate flow to the next possible roving size without increasing the gram weight results in an infusion fabric, which is hard to handle due to it having such clear gaps between the rovings that the fabric has, in practice, no stiffness at all. In a corresponding manner increasing the gram weight either decreases the resin flow capability (if only the roving number is increased) or increases the open flow area (if the roving size is increased) in the infusion fabric such that it loses its integrity. In other words, in many applications one has to use an infusion fabric, which is not exactly the one desired, but a compromise between the resin flow capability and the gram weight. A further feature that has to be taken into consideration is the non-uniformity of the end product, i.e. the reinforcement. If the infusion fabric contains more open cavities than the actual reinforcing layers, which they very often do, in the end product the open cavities are filled with resin. Thereby the proportion of resin is clearly higher at the locations of the infusion fabric/s causing areas of weaker strength in the reinforcement.

Prior art also knows other structures where the rovings are used in basically the same manner as in the US-document, the rovings being, however, surrounded by winding a polyester yarn round the rovings to make the rovings non-compressible. By making the rovings stiff in the above mentioned manner adequate resin flow properties are achieved, but the manner has also downsides. Firstly, the winding of the PE yarn round the rovings does not come for free. Secondly, the availability of applicable rovings is very limited, whereby the diameter of the rovings-PE yarn package cannot be freely chosen. Thirdly, the winding of a PE yarn round the rovings make the rovings quite a tight package, whereby it is a potential risk that the resin may not be able to wet-out the rovings sufficiently well. In practice, the combination of the two latter problem areas in PE-wound rovings prevents, on the one hand, the user from picking up the best possible diameter for his/her application, and on the other hand, the use of thick PE-wound rovings. It may thus be seen that the use of rovings in infusion products or infusion media results in at least one of several method steps, manual labor, use of material that is to be wasted etc., all of which means increased and, in a way, unnecessary expenses.

The various problems related to the use of rovings as the flow channel creating means is addressed in EP-B1-2874803, which discloses a stitched unidirectional or multi-axial reinforcement for the manufacture of fiber reinforced composites by one of resin transfer molding process and vacuum infusion molding process, the stitched unidirectional or multi-axial reinforcement comprising at least one layer of continuous unidirectional rovings arranged in the reinforcement and mono- or multifilaments, the mono- or multifilaments being arranged transverse to the unidirectional rovings and forming to the sides thereof flow passages extending from one edge of the stitched unidirectional or multi-axial reinforcement to the opposite edge thereof for facilitating, when wetting-out a stack of reinforcements with resin, the flow of resin in a direction transverse to the direction of the unidirectional rovings, the at least one layer and the mono- or multifilaments being bonded together by means of stitching, the mono- or multifilaments having, under compression, a diameter of 70-300 μm.

The reinforcement discussed in the above document is directed for use in the production of spar caps of wind turbine blades, which has a length of tens of meters and a width of a few tens of centimeters. Thus, by arranging resin feed into the mold over the entire length of the spar cap, i.e. at a side of the stack of layers of reinforcements, the resin only needs to flow a few tens of centimeters to impregnate the entire stack of layers of reinforcement. Thus, the wet-out distance is so short that even relatively slow impregnation velocity is considered acceptable. A reason for the slow speed of impregnation is the small diameter of the mono- or bonded multifilaments, the small diameter being necessary in view of the strength properties required by the spar caps, i.e. the use of as small diameter as possible minimizes the risk of micro cracks in the spar cap laminate.

EP-B1-2918398 discusses a fiber reinforced composite for manufacturing a component for a wind turbine, comprising a plurality of first fibers, the fibers being arranged in a unidirectional or biax-configuration, a plurality of second fibers, the second fibers being arranged perpendicularly with respect to a lengthwise direction of the first fibers, and a resin impregnating the first and second fibers, wherein an E-modulus of the resin equals an E-modulus of the second fibers such that when the fiber reinforced composite is stretched in the lengthwise direction the second fibers are allowed to contract at a same rate as the resin.

To be more specific the EP-B1-2918398 discusses, on the one hand, a unidirectional reinforced composite having either the second fibers transverse to the first reinforcing fibers or the second fibers zig-zagging across the layer/s of the first reinforcing fibers, or, on the other hand, a bi-axial reinforced composite where the reinforcing fibers are arranged at angles of +/−45 degrees with respect to the direction of the second fibers and the second fibers being fastened onto the two layers of the first reinforcing fibers by means of stitching. The zig-zagging of the monofilaments in the manner of the EP-document does not seem reasonable, as the infusion of resin takes place normally from one side of the reinforcement towards the other, and arranging the monofilaments in other than parallel orientation to one another forms both widening channels to which resin may hardly enter (as there is hardly any opening to between the monofilaments) and converging channels in which the converging monofilaments and the converging space itself add flow resistance and reduce the speed the resin is able to advance.

Thus, both above cited prior art EP-documents utilize flow passage forming means arranged in a direction transverse to the reinforcing fibers or rovings. The flow passage forming means may be formed of a single monofilament or a bonded multifilament, i.e. a bundle of filaments. Such a construction is limited, in practice, to allowing resin flow in only one direction, which cannot be considered sufficient in the manufacture of articles having a complex or wide-area shape.

In other words, prior art suggests, on the one hand, the use of multifilament yarns or rovings arranged in two directions transverse to one another and stitched together to form an open grid fabric for providing an open grid between reinforcing layers of a reinforcement, and on the other hand, the use of mono- or bonded multifilaments for arranging flow passages for resin in a single direction transverse to the direction of the reinforcing rovings.

However, the practice has shown that the present day stitched reinforcements have several problem areas, like for instance:
  the flow channels provided in the reinforcements or in connection therewith are designed either for long and narrow objects where the resin only needs to flow in one direction, i.e. shortest route through the object, or for more or less round or square objects, where it is sufficient that the resin flows in a similar pace in all directions, thus the prior art does not consider objects having such a complex shape that requires different infusion rate in different directions, the use of prior art woven fabrics as infusion media is limited to a few applicable gram weight-resin flow capability combinations, in prior art infusion fabrics the resin flow channels were in the direction of the rovings, which does not ensure proper and reliable infusion of resin all over the product, the applicability of rovings as the means for arranging flow channels in the reinforcement is very limited, the rovings have problems in their compressibility, in their resin infusion and in their diameter, as discussed above, the infusion fabrics of prior art contain often large open areas, which are, also in the end product, filled with resin causing the end product to have a non-uniform structure with changes in strength values, and the use of rovings as the means for arranging flow channels requires several production steps, which mean increased production time and costs.

The use of mono- or bonded multifilaments has proven to be such an ideal way of providing resin flow channels in connection with unidirectional reinforcements in the production of spar caps of wind turbine blades that it had only one minor problem, namely, the risk of forming micro-cracks when causing kinks in the rovings. However, in the production of the spar caps the problem was solved by using very thin mono- or bonded multifilaments, i.e. the diameter being less than 300 μm.

In spite of the above mentioned problem it was decided to test the use of mono- or bonded multifilaments in connection with other types of products, i.e. multi-axial products requiring load-bearing capability in more than one direction and having a wider area compared to spar caps. It was soon discovered that the resin flow capability of the kind of mono- or bonded multifilaments used in the EP-B1-2874803 was not sufficient in the manufacture of truck or bus panels or boat hulls.

However, it was, surprisingly, discovered that the risk of forming micro-cracks in multi-axial reinforcements was considerably reduced even though the diameter of the mono- or bonded multifilaments was increased. The conclusion was, as the various panels, boat hulls or sandwich laminates were subjected to load in different directions and therefore required the use of multi-axial reinforcements, that at least one reason for the finding is that, in a biaxial or any multi-axial product, the rovings of the neighboring layers in any case are slightly bent when passing one another, whereby the possible additional bending or kinking caused by the monofilaments does not, in practice, have much of an influence anymore. Another factor reducing the tendency of forming micro-crack relates to the weight optimization, as the various panels, for instance, do not have as stringent weight requirements as the spar caps. It was thus learned that mono- or multifilaments having a greater diameter may be used in multi-axial reinforcements, whereby the resin flow channels may be enlarged and thereby the resin flow speed increased.

Definitions

The following illustrative explanations are provided to facilitate understanding of certain terms used frequently in the specification and claims discussing the present invention. The explanations are provided as a convenience and are not meant to limit the invention.

Areal weight—Weight (mass) per unit area of a fabric.

Binder—A polymer material in various forms like powder, film or liquid. The binders may be made of one or several individual binders having different characteristics in chemical or physical properties like stiffness, melting point, polymeric structure, Tg etc. Binder is used to fix together the fiber structure to form a web and finally the reinforcement. Suitable binders are thermoplastic epoxies, co-polyesters, bisphenolic unsaturated polyesters, or their mixtures, just to name a few examples.

Fabric—a flexible woven material consisting of a network of natural or man-made artificial fibres often referred to as thread or yarn. Fabrics are formed, for example, by weaving, knitting, crocheting, knotting, needling or pressing fibres together (felt).

Infusion product/layer—a fabric or non-woven, which is provided with channels for facilitating resin flow in the plane of the product. Is used by placing between reinforcing layers to introduce resin to the entire area of the reinforcement such that the resin may be easily absorbed to the neighboring reinforcing layers.

Laminate—A material that can be constructed by impregnating one or more layers of reinforcement using appropriate resin and hardener mixture and let it harden either by chemical reaction or cooling down of temperature. The laminate is a fiber reinforced structure made of a matrix reinforced by fine fibers of for instance glass, carbon, aramid etc. The matrix may be epoxy, a thermosetting plastic (most often epoxy, polyester or vinylester) or a thermoplastic. Common end uses of glass fiber reinforcements include boats, automobile parts, wind turbine blades, etc.

Matrix—material that binds together the reinforcements to form a composite. Composites use specially formulated polymers, like thermosetting epoxy, vinylester or unsaturated polyester resin, and phenol formaldehyde resins or a thermoplastic resin (see 'Polymer') just to mention a few examples.

Monofilament—A yarn composed of a single continuous filament typically made of synthetic material, such as polyamide (nylon), polyethylene terephthalate, polypropylene, polybutylene terephthalate etc.

Multifilament—A yarn or thread composed of a multitude of continuous filaments typically made of synthetic material, such as polyamide (nylon), polyethylene terephthalate, polypropylene, polybutylene terephthalate etc. Especially, in connection with the present invention, a distinction has to be made between loose compressible multifilaments formed of separate filaments, and bonded multifilaments where the filaments are bonded to one another to make the bonded multifilament behave like a monofilament.

Polymer—Generally includes, for example, homopolymers, copolymers, such as for example, block, graft, random and alternating copolymers, terpolymers, etc, and blends and modifications thereof. Furthermore, unless otherwise specifically limited, the term "polymer" includes all possible geometrical configurations of the material. These configurations include, for example, isotactic, syndiotactic and random symmetries.

Reinforcement—a web comprising of reinforcing fibers, the fibers being anchored to one another by appropriate means. Often manufactured as continuous webs. There are several ways to manufacture the reinforcement in unidirectional or multi-axial or random orientations, e.g. through the textile processing techniques of weaving, knitting, braiding and stitching or by bonding with an appropriate binder.

Reinforcing fibers—fibers used together with a matrix in the manufacture of composite materials. The fibres are usually man-made fibers like glass (including all its variants), carbon (with all its variants) or aramid, which may be used as both continuous filaments and non-continuous fibers. Also wide range of natural fibres such as sisal, flax, jute, cocos, kenaf, hemp, or basalt, just to name a few, have been used.

Resin Transfer Molding (RTM)—A process having two mould surfaces by which a resin is pumped typically at low viscosities and low or high pressures into a closed mold die set containing often a preform of dry reinforcement, that is, to infuse resin into the preform and to make a fiber-reinforced composite part.

Roving—a long and narrow untwisted bundle of continuous fibres or filaments, particularly glass fibres. In this application synonym to tow, whereby the selection of fibres not only contain glass fibres but also carbon, basalt and aramid fibres, more generally man-made continuous fibres.

Roving group or tow group—one or more tows or rovings that are closely spaced.

Stitching yarn—A yarn formed of, for instance, 24 or 48 individual filaments made of texturized polyester. Stitching yarn used normally in the manufacture of unidirectional reinforcements has typically a linear mass density of 76 or 110 dtex. The diameter of an individual filament is typically 5-10 µm.

Tex number—An SI-unit of measure for the linear mass density of yarns and is defined as the mass in grams per 1000 meters. Tex is more likely to be used in Canada and Continental Europe, while denier remains more common in the United States and United Kingdom. The unit code is "tex". The most commonly used unit in connection with man-made synthetic fibers is actually the decitex, abbreviated dtex, which is the mass in grams per 10,000 meters.

Textile—general definition for various types of articles including sheets, webs, fabrics and mats having one or more layers, the layers being formed of uni- or multidirectional threads Thermoplastic—A polymer that is fusible, softening when exposed to heat and returning generally to its unsoftened state when cooled to room temperature. Thermoplastic materials include, for example, polyvinyl chlorides, some polyesters, polyamides, polyfluorocarbons, polyolefins, some polyurethanes, polystyrenes, polyvinyl alcohol, caprolactams, copolymers of ethylene and at least one vinyl monomer (e.g., poly (ethylene vinyl acetates), cellulose esters and acrylic resins.

Thermoset—A polymer material that irreversibly cures. The cure may be done through heat (generally above 200 Celsius), through a chemical reaction (two-part epoxy, for example), or irradiation such as electron beam processing.

Thread—twisted bundle of unitary filaments or fibers, yarn.

Tow—In the composites industry, a tow is an untwisted bundle of continuous filaments, and it refers to man-made fibres, particularly carbon fibres (also called graphite). Tows are designated by the number of fibers they contain, e.g., a 12K tow contains about 12,000 fibres. Here synonym to roving.

Transverse handling stability—A force that prevents a unidirectional reinforcement from being deformed or torn into pieces. Needed when positioning a reinforcement in a mold on top of another reinforcement and moving the reinforcement in a direction transverse to its longitudinal direction.

Transverse direction—Any direction that is not parallel with the reference direction, deviating preferably at least 5 degrees, more preferably at least 10 degrees, most preferably at least 15 degrees from the referenced direction.

Unidirectional (UD) reinforcement—Reinforcement in which all of the rovings or tows run in the same direction, in this particular case in longitudinal direction, but a UD-reinforcement may also be transversal, i.e. oriented at 90° direction. These rovings are often in prior art UD reinforcements bound by means of stitching and typically using some additional light layer of chopped strands or continuous multifilament yarns to hold the rovings together and to prevent their tearing apart, or by weaving where weft yarns give structural stability. The weft yarn may also be hot-melt coated. Another way of binding the rovings or tows together is the use of a binder, for instance a thermoplastic or thermoset binder. Also in that case above mentioned additional stabilizing layers may be used.

Vacuum Infusion—A process using a one-sided mould that shapes the end product. On the lower side is a rigid mould and on the upper side is a flexible membrane or vacuum bag. When vacuum/suction is applied to the mould cavity air escapes from the cavity, whereafter resin is allowed to be infused by the suction (or additionally assisted by small overpressure at the feed side—a feature characteristic to light RTM) to completely wet-out the reinforcements and eliminate all air voids in the laminate structure.

Wet-out distance—The position of the flow front or actually the distance measured from the place resin entered the reinforcement stack to the present position.

Yarn—A long continuous length, often twisted, multifilament, suitable for use in the production of textiles, sewing, crocheting, knitting, weaving, stitching, embroidery and rope making. Yarns may be made of continuous or non-continuous natural or synthetic fibers.

Z-direction—The direction perpendicular to the plane of the layer or the stack of layers, i.e. thickness direction.

BRIEF SUMMARY OF THE INVENTION

An object of the present invention is to offer a solution to at least one of the above discussed problems.

Another object of the present invention is to develop a novel multi-axial stitched reinforcement having excellent permeability to resin in more than one direction transverse to the reinforcing filament orientations.

A further object of the present invention is to develop a novel multi-axial stitched reinforcement in which the resin flow in different directions may be controlled.

A yet further object of the present invention is to speed up the production of multi-axial reinforcements by being able to produce a multi-axial reinforcement in a single production step.

A still further object of the present invention is to develop a novel infusion product whose resin flow capability and gram weight may be freely chosen, i.e. irrespective of one another.

The required permeability to resin of the reinforcement and the required removal of gas from the reinforcement of the present invention are ensured in accordance with a preferred embodiment of the present invention by using at least two sets of mono- or bonded multifilaments arranged between in itself unidirectional reinforcing layers and oriented transverse to one another for forming flow passages for resin for arranging free flow area in more than one direction transverse to the direction of the reinforcing rovings both for the air to escape from the reinforcement and for the resin to impregnate or wet-out the product efficiently.

At least one of the prior art problems is solved and at least one of the objects achieved by means of a stitched multi-axial reinforcement for the manufacture of fiber reinforced composites by one of resin transfer molding process and vacuum infusion molding process, the stitched multi-axial reinforcement comprising at least a first reinforcing layer of continuous unidirectional rovings having a first axial direction, a second reinforcing layer of continuous unidirectional rovings having a second axial direction and a first set of mono- or bonded multifilaments; the first axial direction and the second axial direction leaving an angle therebetween; the mono- or bonded multifilaments of the first set being arranged between the first and the second reinforcing layers, the first and the second reinforcing layers and the mono- or bonded multifilaments of the first set being bonded to one another by means of stitching, wherein a second set of mono- or bonded multifilaments is arranged between the first and the second reinforcing layers in a direction transverse to the mono- or bonded multifilaments of the first set of mono- or bonded multifilaments.

In a similar manner at least one of the prior art problems is solved and at least one of the objects achieved by means of a method of producing a stitched multi-axial reinforcement for fiber reinforced composites comprising the steps of:
a) laying continuous rovings unidirectionally side by side in a first axial direction for forming a first reinforcing layer,
b) laying a first set of mono- or bonded multifilaments on the first reinforcing layer in a direction transverse to the axial direction of the unidirectional rovings of the first reinforcing layer,
c) laying a second set of mono- or bonded multifilaments on the first reinforcing layer and on the first set of mono- or bonded multifilaments in a direction transverse to both the mono- or bonded multifilaments of the first set and the axial direction of the unidirectional rovings forming the second reinforcing layer in step d),
d) laying continuous rovings unidirectionally side by side in a second axial direction on the first reinforcing layer and on the first set and the second set of mono- or bonded multifilaments for forming a second reinforcing layer,
e) stitching the first and second reinforcing layers and the first set and the second set of mono- or bonded multifilaments therebetween to one another to form a multi-axial reinforcement with a top surface and a bottom surface.

Other characteristic features of the stitched multi-axial reinforcement of the present invention and the method of its manufacture are disclosed in the appended patent claims.

With the present invention at least some of the following advantages may be reached
the permeability of stitched multi-axial reinforcements is improved to such a level that facilitates good resin flow,
the use of monofilaments in infusion products ensures that the resin flow capability and gram weight may be chosen freely, irrespective of one another, for all applications,
the distance the resin advances in transverse direction in a certain period of time is increased considerably, in the performed experiments to at least 2-fold,
the time needed for the impregnation is reduced considerably, in the performed experiments to at least one fourth of the time needed with prior art reinforcements,
the resin flow passages in two different directions ensure that the resin reaches all parts of the reinforcement even though a channel in the primary resin flow direction may for some reason be blocked,
more uniform reinforcement due to more even resin distribution all over the reinforcement, and
the resin flow properties in different directions may be adjusted by varying at least one of the direction and the diameter of the mono- or bonded multifilaments.

BRIEF DESCRIPTION OF DRAWING

In the following, the stitched multi-axial reinforcement of the present invention and the method of its production are discussed in more detail with reference to the appended figures, in which.

DETAILED DESCRIPTION OF DRAWINGS

Figure 1A:
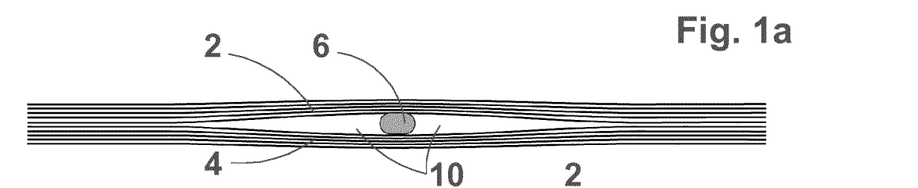
FIGS. 1a and 1b illustrate schematically a comparison between the behaviors of prior art mono- and multifilaments, in this case a monofilament and a multifilament yarn under compression between two reinforcing layers of rovings.
Figure 1B:
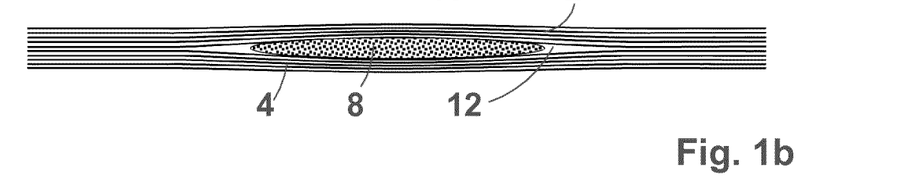

FIGS. 1a and 1b illustrate schematically the cross section comparison between the behaviors of a monofilament or a bonded multifilament of EP-B1-2874803, and a prior art multifilament yarn (like the one used in US-A-2005/0037678) under compression of vacuum infusion process between two reinforcing layers of rovings. FIG. 1a illustrates a cross section of two overlapping reinforcing layers 2 and 4 made of bundles of unidirectional rovings stitched by means of transverse stitching (not shown) together as a reinforcement having a monofilament 6 arranged at right angles to the UD-rovings between the layers 2 and 4 thereof. FIG. 1b shows the same reinforcing layers 2 and 4 made of bundles of unidirectional rovings stitched by means of transverse stitching together as a reinforcement having a multifilament yarn 8 arranged at right angles to the rovings between the layers 2 and 4 thereof. FIG. 1a shows how the monofilament still pushes or keeps the rovings of the reinforcements 2 and 4 apart such that open flow passages 10 are formed between the reinforcements 2 and 4 to the sides of the monofilament 6. FIG. 1b shows the rovings of the reinforcements 2 and 4 pushed apart in a manner equal to FIG. 1a, i.e. the thickness of the two reinforcements with the transverse monofilament or multifilament is the same. However, it may be seen that the multifilament yarn 8 needed for pushing or keeping the rovings apart is of totally different size and cross sectional area. It has transformed to an oval or flat shape under compression such that, in practice there are no true flow passages 12 at the sides of the multifilament yarn 8.

The reason is that the multifilament yarns are made of tens or hundreds of individual filaments, each filament having a diameter of 5-10 µm. When the multifilament yarn is subjected to compression pressure, i.e. in the vacuum infusion stage in the mold, the filaments of the multifilament yarns are forced to move sideways so that the Z-direction dimension of the multifilament yarn is a fraction of the apparent original diameter of the multifilament even if it is twisted. The twist is typically quite low, of the order of 20-40 turns per meter, as it is important that resin is able to penetrate also between the filaments of twisted yarn to avoid dry spots. In accordance with performed tests it was learned that a multifilament, i.e. a polyester yarn having a thickness of 130 μm under compression with 0.5 bar (small compared to infusion compression of 0.95 bar), has a dtex number of 1120 dtex whereas a monofilament having a similar diameter of 130 μm with and without compression has a much lower dtex number of 167. A glass fiber yarn may have in the same conditions a dtex number of about 18-fold compared to that of a monofilament. Though the dimensions are not necessarily the same as in the present invention the teachings remain the same, i.e. a loose roving flattens in the same manner irrespective of its original diameter. This means, in view of the resin flow, that each filament moving sideways decreases the cross section of the cavity at the side of the multifilament such that the channel cross section is finally, in practice insignificant. This prevents the resin flow through these voids or channels.

Yarns with high twist, of the order of 150 TPM (TPM=turns per meter) or more, could be effective in resisting the compressive effect of vacuum. Yet they are not favored in composite end use due to their slow and incomplete resin penetration properties and also due to their fibers being in coil formation with unfavorable elastic response under tensile load compared to their adjacent non-twisted roving yarns. Moreover twisted yarns are stiff in character leading to kinks in reinforcing UD-rovings. When twisted yarns are used their twist is typically relatively low, i.e. of the order of 20-40 TPM, as it is important that resin is able to penetrate between the filaments of twisted yarn.

Thus, the use of twisted multifilaments is by no means recommendable as either the multifilament having a low twist is able to flatten and thereby lose its capability of forming flow passages for resin or the multifilament having a high twist may not be able to absorb resin. The same problem may also be seen if a yarn is wound on the multifilament to make the multifilament non-compressible. The more stiff and non-compressible the multifilament is made, the weaker it is able to absorb resin. Also, as mentioned already above, using glass fiber rovings as the multifilament reduces the variability of the diameter, as there are not too many "sizes" in otherwise applicable rovings. For solving the above problem the use of bonded multifilaments is recommended, as discussed in connection with FIGS. 2a through 2d.

The already above used term "bonded multifilaments" refers to a multifilament, which is formed of a bundle of monofilaments bonded together by chemical means. As shown in FIGS. 2a through 2d, the bonded multifilament comprises for instance 3 filaments, possibly 5 or more filaments arranged in communication with each other such that a desired gap having a Z-direction dimension is left between the reinforcements when they are placed one on top of another.

Figure 2A:
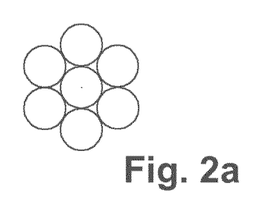
FIGS. 2a-2d illustrate various options for replacing a monofilament with a bonded multifilament, i.e. a bundle of monofilaments bonded together.
Figure 2B:
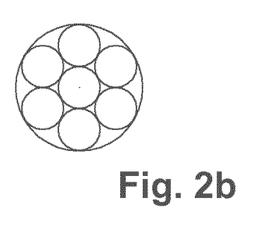
Figure 2C:
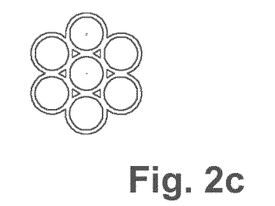
Figure 2D:
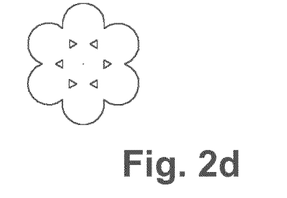

Another option is to arrange a number of monofilaments in communication with one another such that the cross section of the bundle remains substantially the same under compression. In practice it means that the monofilaments have to be, in accordance with an additional preferred embodiment of the present invention, fastened to each other, as illustrated in FIGS. 2a through 2d, whereby a more compact bonded multifilaments are formed and the aspect ratio (width-height ratio) of the bundle of monofilaments is easily below 2.0. The aspect or width-height ratio is determined from the cross section of the mono- or bonded multifilaments such that the height is measured in the direction of compression (i.e. perpendicular to the plane of the reinforcement) and the width at right angles thereto. The monofilaments of the bundle may be during their application phase either heat-treated or sprayed by a liquid binder so that the monofilaments attach to each other as shown in FIG. 2a, and, thus, are not able to move under compression. The bundle of monofilaments may also be embedded in an appropriate coating material as shown in FIG. 2b, or the monofilaments of a bundle may be bi-component monofilaments coated with a specific binder as shown in FIG. 2c. In all above cases it is advantageous if the binder used in bonding the monofilaments is compatible with the resin matrix of the future laminate. Another prerequisite for the binder material is that the resulting bonded multifilaments are as flexible as possible in order to prevent the formation of kinks in the laminate. Also, the monofilaments may be fused to one another as shown in FIG. 2d. When using such bonded multifilaments, the diameter, or actually the Z-direction dimension, of the bonded multifilaments is of the order of 50-2000 μm, preferably of 100-1000 μm, more preferably between 150-900 μm, 200-700 μm or 200-500 μm. Other preferred ranges are 500-1000 μm, 500-900 μm and 500-800 μm.

Thus, to ensure that the flow passages formed by the various mono- or bonded multifilaments are as efficient as possible in relation to the amount of foreign matter brought into the reinforcement by the mono- or bonded multifilaments, the bundle of monofilaments should be as compact as possible, which means that its aspect ratio (width/height-ratio) should be equal or less than 2.0, preferably less than 1.5, most preferably as close to 1.0 as possible, when the mono- or bonded multifilaments is subjected to vacuum, i.e. compression in the wet-out or impregnation stage. Aspect ratio 2 means, for instance, two monofilaments arranged side by side.

The mono- or bonded multifilaments are preferably formed of polyamide (PA), co-polyamide or copolyester (co-PET) monofilaments that may have, for instance, a round, square or oval cross section or an X- or hollow cross section. Mono- or bonded multifilaments may also be bicomponent or multicomponent ones. In other words, as the mono- or bonded multifilaments are manufactured from a suitable polymeric material by, for instance, extrusion, the cross section of the mono- or bonded multifilaments may be, in practice, chosen freely for optimizing the resin flow properties. In view of the present invention it is advantageous to use such a mono- or bonded multifilaments cross section that creates maximal geometrical cross section or maximize the distance between the reinforcing rovings in two overlapping reinforcing layers with given volume, while keeping the amount of non-reinforcing material (the monofilament polymer) to a minimum.

As to the shape and size of the mono- or bonded multifilaments as well as their positioning on the reinforcing layers, i.e. their lateral distance from each other, all these features (among others) have to be considered carefully in view of proper impregnation and wet-out of the reinforcement stack with resin. The resin flow passages formed to the sides of the mono- or bonded multifilaments shall not be too open to give the resin sufficient time to impregnate into the rovings and not to flow directly from the side of the stack of reinforcement where the resin is introduced to the opposite side of the reinforcement stack. Naturally, the shorter the distance is between adjacent mono- or bonded multifilaments, the more open, i.e. larger cross-section, the transverse flow passages at the sides of the mono- or bonded multifilaments may be, and vice versa. Another thing that has to be taken into account is the thickness or gram weight of the reinforcing layer. The thicker the reinforcing layer is the more time it takes to properly wet-out the reinforcing layer with resin. With the present invention it is possible to adjust the permeability of the reinforcement to make sure that the individual reinforcing fibers will be well impregnated and no dry areas or voids are left between the fibers.

An ideal property for polymer material for the mono- or bonded multifilaments is that the material does not retard the curing or otherwise has no negative effect on the chemical, thermal or the mechanical properties of the resin, which forms the matrix. In the performed experiments mono- or bonded multifilaments of polyamide (PA), co-polyamide or co-PET have been used. However, other materials that function in a desired manner may also be used.

Another preferred optional property for polymer material for the mono- or bonded multifilaments is that the material is, at least partially, soluble to the resin. However, the solubility should be so weak or slow that the reinforcement has time to be impregnated by resin before the mono- or bonded multifilaments "disappear" or "collapse". However, the advantage of the at least partially soluble mono- or bonded multifilaments is that the channels formed by the mono- or bonded multifilaments vanish/disappear, and the product as well as the matrix gets even more homogenous than when using non-soluble mono- or bonded multifilaments. As an example of above discussed variants, a bicomponent mono- or bonded multifilaments structure comprising a monofilament or a bundle of monofilaments, provided with an outer layer of polymer material with differing properties may be mentioned, the outer layer being soluble to the matrix material. The solubility of the outer layer is preferably chosen such that it dissolves into the resin after the resin has impregnated the stack of reinforcements. The advantage of this monofilament structure is that the core part of the monofilaments itself may have a diameter of 200 μm, and the outer layer thickness of 150 μm. Thereby the diameter of the bicomponent monofilament is during the impregnation 500 μm, and after the dissolution of the outer layer only 200 μm whereby the rovings in the final product get closer to each other. This minimizes even further the risk of premature laminate failure to virtually zero at the junctions between mono- or multifilaments and the rovings.

Figure 3:
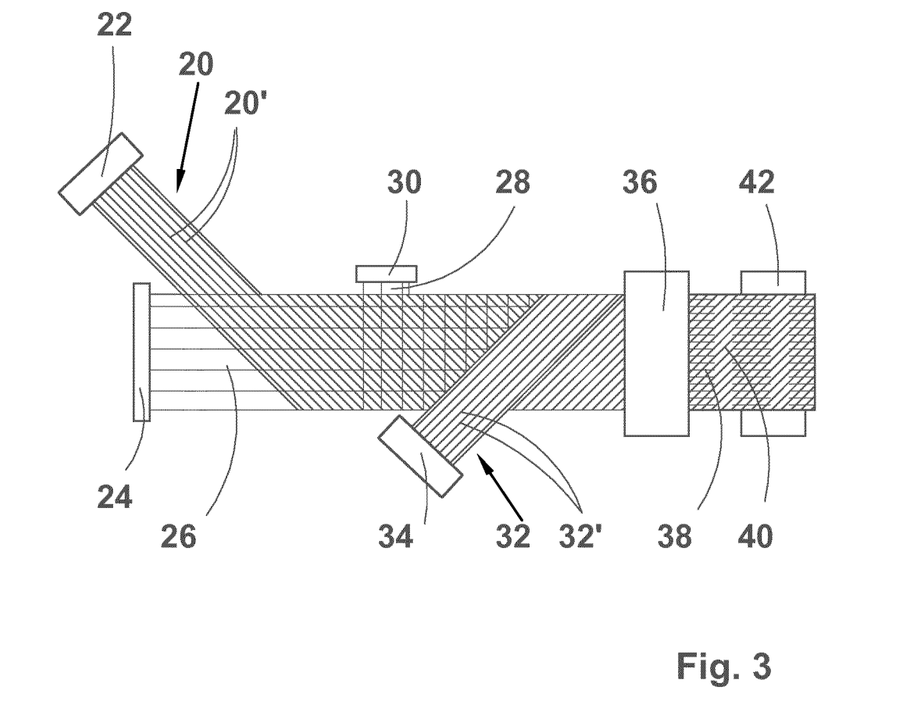
FIG. 3 illustrates schematically the production process of the stitched multi-axial reinforcement in accordance with a preferred embodiment of the present invention.

FIG. 3 illustrates schematically the production process of the stitched multi-axial reinforcement in accordance with a preferred embodiment of the present invention. The manufacture of a stitched multi-axial reinforcement proceeds as follows. To start with, a first reinforcing layer 20 of unidirectional rovings 20' (preferably but not necessarily of glass fiber or carbon fiber rovings or tows or aramid fibers as well as flax, hemp, jute, sisal, cocos, kenaf, basalt or other natural fibers) is formed by pulling the rovings 20' from the packages 22 and arranging them side by side or in a controlled distance from each other depending on the targeted areal weight in a first axial direction, here +45 (optionally also, for instance, 0 or +60) degrees. From now on the word "rovings" is used to refer to all such tows, rovings, fibers etc. that are used in the manufacture of unidirectional reinforcements. Thus the rovings are arranged side by side in one or more reinforcing layers of rovings.

Next on the first reinforcing layer 20 is laid from feed means 24 a first set 26 of mono- or bonded multifilaments running in machine direction, i.e. in a direction of travel of the reinforcement to be produced, or at least in a direction transverse to the rovings 20' of the first reinforcing layer 20. Then a second set 28 of mono- or multifilaments is laid from feed means 30 on the first reinforcing layer 20 and on the first set 26 of mono- or bonded multifilaments, preferably, but not necessarily, transverse to the first axial direction of the first reinforcing layer 20. Naturally, the order in which the first and the second sets of mono- or bonded multifilaments is laid on the first reinforcing layer 20 may be freely chosen. Thereafter a second reinforcing layer 32 of unidirectional rovings 32' is formed by pulling them from the packages 34 and arranging them side by side or in a controlled distance from each other depending on the targeted areal weight in a second axial direction, here −45 (optionally also, for instance 90 or −60) degrees. Thus the mono- or bonded multifilaments of both sets 24 and 26 are left between the two reinforcing layers 20 and 28, whereby the mono- or bonded multifilaments of the first and the second sets are in direct contact with one another. The mono- or bonded multifilaments of the present invention have a diameter of 50-2000 μm, preferably of 100-1000 μm, and more preferably 150-900 μm, 200-700 μm or 200-500 μm. Other preferred ranges are 500-1000 μm, 500-900 μm and 500-800 μm. The diameter, or Z-direction thickness, is ideal in case the viscosity of infused resin-curing agent mixture is on the level of 200-350 mPas at room temperature. If viscosity differs clearly from this, it may be necessary to adjust the distance between the mono- or bonded multifilaments or the diameter/Z-direction thickness thereof. Here the word 'transverse' means primarily any non-parallel direction. However, if and when some safety margin is needed the word "transverse", for instance with regard to the direction of mono- or bonded multifilaments, means any such direction that deviates at least 5, 10 or 15 degrees from the direction of the first and second axial directions of the reinforcing rovings of the first and the second reinforcing layer. The purpose of the deviation is to prevent the mono- or bonded multifilaments from orienting locally between the rovings whereby the goal of facilitating the resin flow would be lost or at least seriously compromised. The same angular displacement also applies to the directions of the first and the second sets of mono- or bonded multifilaments, i.e. they should, preferably, but not necessarily, form an angle of at least 5, 10 or 15 degrees, too.

However, as a second, supplementary embodiment of the present invention it should be understood that the sets of mono- or bonded multifilaments may be arranged such that the first set of mono- or bonded multifilaments has a filament orientation transverse to the first axial direction of the first reinforcing layer but parallel to the second axial direction of the second reinforcing layer. In a corresponding manner, the second set of mono- or bonded multifilaments may have a filament orientation in parallel with the first axial direction of the first reinforcing layer but transverse to the second axial direction of the second reinforcing layer. Here, the idea is, naturally, that the mono- or bonded multifilaments of the first set of mono- or bonded multifilaments, due to their stiffness, are not capable of bending at the open area between two adjacent mono- or bonded multifilaments of the second set of mono- or bonded multifilaments to reach the surface of the second reinforcing layer and thereby blocking the resin flow between the mono- or multifilament and the reinforcing layer and vice versa. Naturally, the shorter the distance between the neighboring mono- or bonded multifilaments of one set is, the less stiffness is required from the mono- or bonded multifilaments of the other set. Thus, for optimizing the resin flow properties of the mono- or bonded multifilaments the diameter and the stiffness thereof as well as the distance between the neighboring mono- or bonded multifilaments have to be taken into account and the best combination of those have to be selected to best fulfil the requirements of each particular application.

The mono- or bonded multifilaments of the second set 28, and also those of the first set 26, if the direction of the first set 26 is not parallel with the direction of travel of the reinforcement to be produced, may be arranged on the first reinforcing layer 20 by using a well-known yarn carriage system of multi-axial production machines, i.e. by means of a tool that travels transversely back and forth above the first reinforcing layer laying a certain number of mono- or bonded multifilaments on the first reinforcing layer at a time. The laying may, for instance, be facilitated with servolinear movement manipulator with mono- or bonded multifilaments feeding arrangement.

An advantageous feature of the present invention is that both sets of mono- or bonded multifilaments are laid on the first reinforcing layer 20 in straight, parallel formation each, i.e. the mono- or bonded multifilaments of the first set 26 run linearly and uniformly in the desired direction, preferably mostly in the direction of the travel of the reinforcement 38 to be produced, and the second set 28 of mono- or bonded multifilaments runs linearly and uniformly from one edge of the reinforcing layer 20 to the opposite edge thereof, in other words the mono- or bonded multifilaments, for instance, do not form loops found typically in knitting patterns. Essentially straight, i.e. linear and flat formation of mono- or bonded multifilaments across the unidirectional reinforcing rovings ensure shortest resin flow time between the reinforcement edges as straight line is the shortest way between two points. Irrespective of the actual location and direction of the mono- or bonded multifilaments of the two sets they are arranged at regular intervals, i.e. at about 2 to 50 mm, preferably 5-25 mm, more preferably at about 5-15 mm lateral distance or spacing from one another. The exact distance must be optimized according to resin viscosity and reinforcing layer gram weight, just to name a few variables.

However, it has to be understood that the above discussion refers to the simplest method of manufacturing a multi-axial, in this case a biaxial, reinforcement. Basically the same method may be applied in the manufacture of reinforcements having several in itself unidirectional reinforcing layers. If a multi-axial reinforcement having more than two reinforcing layers is to be manufactured as many additional means for forming new reinforcing layers is needed. Also, as it is preferable, but not always necessary, that both transverse sets of mono- or multifilaments should be laid between each pair of reinforcing layers, each additional reinforcing layer requires feeding means for both sets of mono- or bonded multifilaments. Also, when laying the mono- or bonded multifilaments it should be remembered that such should be neither parallel nor nearly parallel with the reinforcing rovings of the closest reinforcing layer, i.e. the reinforcing layer on which they are resting, but, preferably but not necessarily, the inclination of at least 5, 10 or 15 degrees should be arranged therebetween. However, the bonded mono- or multifilaments may be parallel with the reinforcing rovings of the more remote reinforcing layer.

As a third, supplementary embodiment of the present invention, which brings about at least one great advantage, a reinforcement structure that contains the two sets of mono- or bonded multifilaments and possibly some other features discussed in connection with the present invention, comprises additionally the sets of mono- or bonded multifilaments having different diameters. The different diameters aid in controlling the resin flow between the reinforcing layers. If we, for instance, assume that the diameter of the first set of mono- or bonded multifilaments is 300 μm and that of the second set of mono- or bonded multifilaments is 600 μm, the performed experiments show that the resin advances in the direction of the thicker mono- or bonded multifilaments faster or advances a certain distance quicker. When using such mono- or bonded multifilaments, the diameter, or actually the Z-direction dimension, of the mono- or bonded multifilaments of the set of mono- or bonded multifilaments having a smaller diameter may vary between 50 and 1000 μm, preferably between 150 and 900 μm, more preferably between 200 and 700 μm. This feature may be utilized when the reinforcement to be produced has a complex and wide-area shape. The detailed structure of the reinforcement of the third embodiment is discussed in more detail in connection with FIGS. 4b and 4c.

It should also be understood as a fourth, supplementary embodiment of the present invention that mono- or bonded multifilaments may be placed on top and/or bottom surface/s of the reinforcement, too, i.e. the mono- or bonded multifilaments may not only be found between the reinforcing layers. The same rules for placing the mono- or bonded multifilaments on the top and the bottom surfaces of the reinforcements as when placing such between the reinforcing layers applies here, too, i.e. the orientation of the mono- or bonded multifilaments may not be the same as that of the rovings of the closest reinforcing layer.

In accordance with a fifth supplementary embodiment of the present invention triaxial and quadraxial reinforcements may be discussed. A triaxial reinforcement is produced by adding a third reinforcement layer having rovings in a third axial direction either below the first reinforcing layer or on top of the second reinforcing layer when compared to the production discussed in connection with FIG. 3. A quadraxial reinforcement is produced by adding a third reinforcing layer having rovings in a third axial direction below the first reinforcing layer and a fourth reinforcing layer having rovings in a fourth axial direction on top of the second reinforcing layer when compared to the production discussed in connection with FIG. 3. Also, if desired or considered necessary, at least one set of mono- or bonded multifilaments may be provided between the third reinforcing layer and the closest adjacent reinforcing layer, as well as between the fourth reinforcing layer and the closest adjacent reinforcing layer. The same rules than in the above embodiments, i.e. that the mono- or bonded multifilaments of each set of mono- or bonded multifilaments arranged between two reinforcing layers may not be parallel with the rovings of the closest reinforcing layer, but, preferably but not necessarily, the inclination of at least 5, 10 or 15 degrees should be arranged therebetween, apply here, too.

After a desired number of reinforcing layers and a desired number of sets of mono- or bonded multifilaments are laid one on top of another, the stack of reinforcing layers is taken to a bonding step 36 where the reinforcing layers and the sets of mono- or bonded multifilaments laid therebetween are stitched, stitches 38 shown by dashed lines, to one another to form a unitary reinforcement 40 having rovings in multi-axial configuration. Thereafter the multi-axial reinforcement 40 is rolled at 42 for delivery to a customer.

When bonding the multi-axial reinforcements of the above embodiments by stitching the positioning of the mono- or bonded multifilaments, more specifically the length of the stitches and the distance or spacing between adjacent or neighboring mono- or bonded multifilaments should be arranged such that at most one mono- or bonded multifilament is left within the stitch. In theory this means that the length of a stitch is less than the gap between neighboring mono- or bonded multifilaments. However, as the laying of the mono- or bonded multifilaments does not necessarily result in exactly linearly running mono- or bonded multifilaments, the stitch length should be clearly less than the gap between neighboring mono- or bonded multifilaments. The reason for this precautionary measure is that if two or more mono- or bonded multifilaments are located within a stitch the stitching yarn draws the mono- or bonded multifilaments together, i.e. side by side, whereby a true gap to the next adjacent mono- or bonded multifilaments is too long for proper infusion of resin.

As shown schematically in prior art FIG. 1a the mono- or bonded multifilaments 6 used between the reinforcing layers 2 and 4 for improving both the permeability of the stack of reinforcements to resin in transverse direction and air removal from between the stack of reinforcing layers create small flow passages 10 on both of their sides and between the reinforcing unidirectional rovings.

Figure 4A:
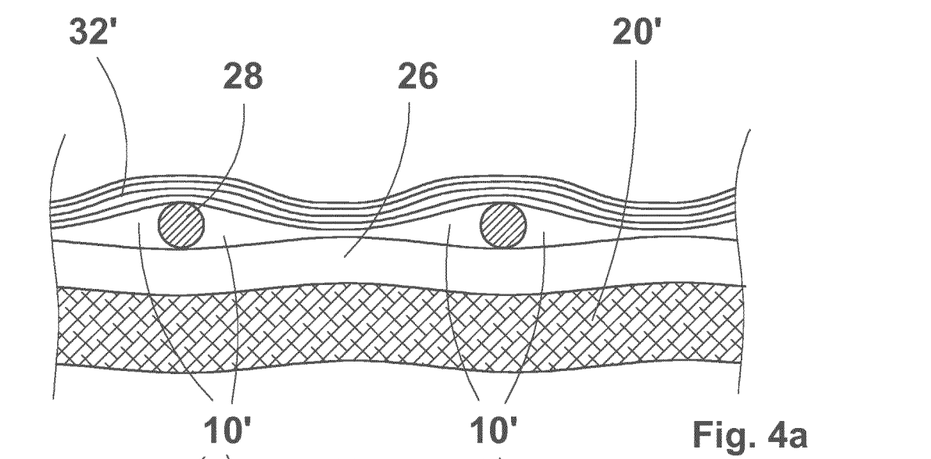
FIGS. 4a through 4c illustrate schematically cross sections of the biaxial reinforcement manufactured in the manner discussed in FIG. 3, and
FIG. 5 compares a prior art stitched reinforcement with two stitched reinforcements of the present invention in view of resin flow distance in transverse direction.
Figure 4B:
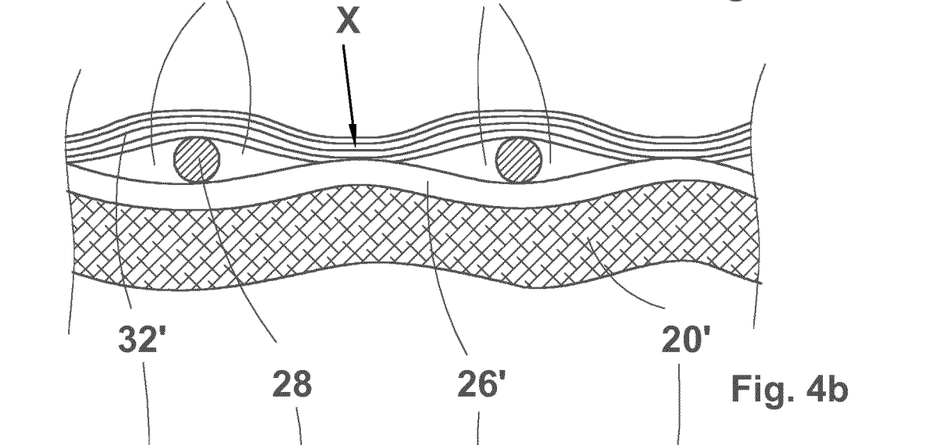
Figure 4C:
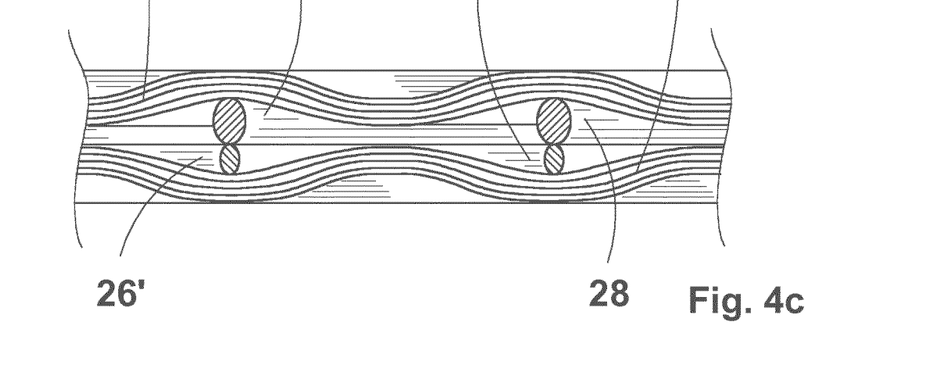

The stack of reinforcements of the present invention as shown in FIGS. 4a through 4c functions in the infusion stage such that infusing resin will flow through the flow passages 10' crosswise to reinforcing rovings 32' and then penetrate between the individual reinforcement rovings or filaments and secure fast resin flow and good impregnation. During the infusion the advancing resin pushes the remaining air bubbles along the chambers or cavities inside the reinforcement structure to the flow passages and finally out of the product. Both the advancing of the resin and removal of the air may additionally be facilitated by pressurizing the feed of the resin in case stiff upper molds are in use like in RTM or Light RTM (though seldom used) at the first ends of the flow passages and/or by arranging vacuum to the opposite ends of the flow passages. Now that the mono- or bonded multifilaments of the two sets are arranged transverse to one another the mono- or multifilaments may be oriented in desired direction, whereby the direction of the resin flow may be controlled better than in prior art products. This is especially so if the diameter of the first set of the mono- or bonded multifilaments is different from that of the second set of the mono- or bonded multifilaments. In other words, the resin flow may, for instance, be oriented in the direction of the shortest, or longest dimension of the product to be manufactured depending on the application.

Irrespective of the diameter or detailed cross section or other structure of the transverse mono- or multifilaments, it is clear that the mono- or bonded multifilaments do not, in accordance with the present invention, give any particular transverse stability to the reinforcement, but the stability is solely ensured by the use of stitching.

Figure 5:
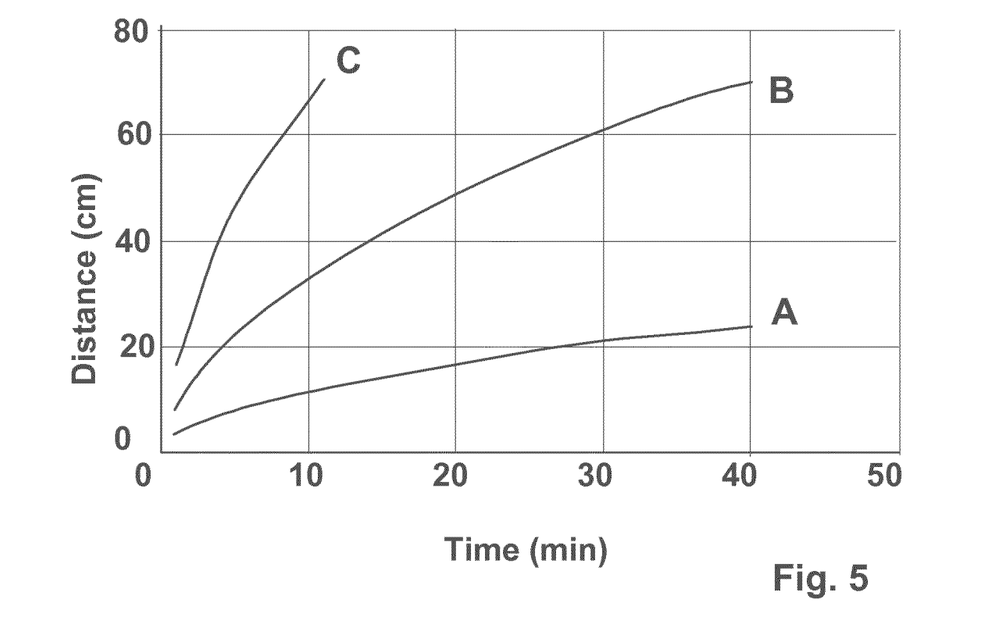

FIGS. 4a through 4c illustrate schematically, on the one hand, the effect the mono- or bonded multifilaments arranged transverse to one another bring to the reinforcement and, on the other hand, the effect the varying diameter of the mono- or bonded multifilaments brings about. FIG. 4a shows a cross section of the reinforcement of the present invention taken in the axial direction of the rovings 32' of the second reinforcing layer and that of the first set 26 of mono- or bonded multifilaments, the rovings 20' of the first reinforcing layer and the second set 28 of mono- or bonded multifilaments being oriented at right angles to both the rovings 32' of the second reinforcing layer and the mono- or bonded multifilaments of the first set 26 of mono- or bonded multifilaments. Both the rovings 32' of the second reinforcing layer and the first set 26 of mono- or bonded multifilaments are shown to bend under compression in the infusion stage. In the embodiment of FIG. 4a the mono- or bonded multifilaments of both sets 26 and 28 have the same diameter. FIG. 4b is in all other respects similar but the first set 26' of mono- or bonded multifilaments has now a smaller diameter than that of the second set 28 of mono- or bonded multifilaments. By comparing the exemplary figures it is easy to see that the thinner mono- or bonded multifilament (of the first set 26') bends more and thereby reduces slightly the cross sectional flow area of resin flow channels 10' in the direction of the thicker mono- or bonded multifilaments (of the second set 28). However, what is more important is that the cross sectional flow area in the direction of the thinner mono- or bonded multifilaments (of the first set 26') is reduced more, as the bent rovings 32' of the second reinforcing layer are, in the least, almost able to get into contact with those 20' of the first reinforcing layer at point X. Thereby resin flow in the direction of the thinner mono- or bonded multifilaments (of the first set 26') is more restricted than in the direction of the thicker mono- or bonded multifilaments (of the second set 28). Basically the same is shown in FIG. 4c where the cross section is taken such that the first thinner set 26' of mono- or bonded multifilaments come from the left towards the viewer and the second thicker set 28 of mono- or bonded multifilaments from the right towards the viewer FIG. 5 is a chart comparing the resin flow or wet-out properties of three biaxial reinforcements manufactured in accordance with the method discussed in FIG. 3. In other words the reinforcing layers were formed of two +/−45 degrees unidirectional reinforcing layers and the monofilaments laid at 0 and 90 degrees orientations therebetween. The experiment was performed such that three different biaxial reinforcements were prepared. In the manufacture of the reinforcements the same unidirectional rovings, the same stitching yarn and the same kind and type of stitch were used. The only difference was in the diameters of the sets of monofilaments that were placed with 10 mm spacing and arranged at an angle of 0 and 90 degrees in relation to the travelling direction of the reinforcement to be produced between the two reinforcing layers of UD rovings. The monofilament diameters used in the experiment were 140 µm, 300 µm and 600 µm. In the chart the X-axis shows the time used for impregnation and the Y-axis the distance the resin was able to advance.

For the experiment, a 70 cm by 70 cm sheet of biaxial reinforcement of the present invention was cut from each biaxial reinforcement such that the rovings formed angles of +/−45 degrees to the sides of the sheet and the mono- or bonded multifilaments were parallel with the sides of the sheet, i.e. at angles of 0/90 degrees. In each experiment the sheet was placed in test mold comprising glass sheet underside such that plastic film covered the reinforcement. The package was made airtight with usual sealing mass. Thereafter the mold was subjected to vacuum of −0.95 bar for air removal for 10 minutes, whereafter epoxy resin having a viscosity of 300 mPas was introduced crosswise to reinforcing rovings into the mold at a room temperature of 23° C. A chart was drafted by recording the wet-out distance the resin has advanced as a function of time.

FIG. 5 illustrates the wet-out distance the resin has traveled as a function of time. The flow front position typically follows the well-known Darcy's law where the position is inversely proportional to square root of time. Thus there is a certain maximal value, which may be infinitely approached but never reached. Difference in permeability determines the actual distance of flow front, i.e. the wet-out distance, if other parameters like viscosity and temperature are kept constant. The lowermost graph A represents a biaxial reinforcement where the monofilament diameter was 140 μm, the graph B at the center represents a biaxial reinforcement where the monofilament diameter was 300 μm, and the uppermost graph C represents a biaxial reinforcement where the monofilament diameter was 600 μm. The graph B at the center is, in fact quite similar to that of the prior art product discussed above. As may be seen in FIG. 5, in the reinforcement where the monofilament diameter was 140 μm the speed the resin advances in the reinforcement is very slow, i.e. for advancing 20 cm the resin needs some 26 minutes, which is quite inappropriate in the manufacture of complex and wide-area objects. Since the lowermost graph is almost horizontal at 40 minutes, it is expected that even a considerable increase in the impregnation time would not increase the impregnation distance much. Thus, the experiment shows that thin monofilaments, even when laid in two transverse directions between the reinforcing layers do not improve the wet-out property of a multi-axial reinforcement. In the second experiment, where the monofilament diameter was 300 μm the wet-out speed was better and corresponds quite well to the prior art product. However, the resin still requires 20 minutes to advance some 50 cm and 40 minutes to advance about 70 cm. By increasing the wet-out time the wet-out distance would still increase by a few cm's. In the third experiment where the monofilament diameter was 600 μm it took a bit over 10 minutes for the resin to advance about 70 cm. In other words, the wet-out speed quadrupled when compared to the prior art product or the experiment with 300 μm monofilaments. By increasing the wet-out time the wet-out distance would increase significantly. In other words, the performed experiments suggest that, if long impregnation distance is needed the use of relatively thick mono- or bonded multifilaments in accordance with the present invention reduces the wet-out time to about one fourth compared to prior art reinforcements. A further way to increase the wet-out distance in a certain period of time is to reduce the distance between adjacent mono- or bonded multifilaments to 5 mm, for instance. Such would, if compared to the examples of FIG. 5, reduce the time needed for having the resin advance about 70 cm to about 5 minutes.

The above experiments show clearly the huge advantage the novel design of having flow passages in two transverse or non-parallel directions brings. And as discussed already above it is not only a question of "high-speed" infusion that increases the production speed significantly, but also a question of very efficient gas removal from the stack of reinforcements ensuring void-free laminate without dry or semi-impregnated areas, and a question of a laminate that has better strength and fatigue properties than prior art laminates used for the same purposes.

The multi-axial reinforcement of the present invention may be used with all kinds of infusion methods, including but not limited to vacuum infusion, Light RTM or RTM methods. Other lamination cases where resin impregnation is critical or otherwise retarded by tightly arranged fibers or other materials are present in the laminate structure, such as sandwich materials, fire retarding materials, fillers, pigments etc., where resin viscosity may be extremely high, may be improved by means of the reinforcement of the present invention.

The multi-axial reinforcements of the present invention may be used in both manufacture of preforms or end products, i.e. laminates like for instance wind turbine blades, boats, sporting equipment, storage tanks, bus, trailer, train and truck panels, etc. The preforms may be manufactured of at least two in itself unidirectional reinforcing layers by laying the reinforcing layers one on top of another such that the axial directions thereof form an angle (for biaxial reinforcements preferably, but not necessarily +/−45 degrees, +/−60 degrees or 0/90 degrees), by positioning the mono- or bonded multifilaments in at least two transverse directions between the reinforcing layers such that the direction of the mono- or bonded multifilaments is not parallel with the axial dimension of the rovings of the closest reinforcing layer, by stitching the multi-axial reinforcement, and finally by using appropriate binder for bonding the reinforcement together for forming the preform.

In a similar manner a laminate may be manufactured of the multi-axial reinforcement of the invention or of the above discussed preform. In the method of manufacturing the laminate at least two multi-axial reinforcements, or preforms, are laid one on top of another in the mold, a cover is positioned on the multi-axial reinforcements, the mold is closed, and a pressure difference is provided for evacuating air from the mold and for impregnating the multi-axial reinforcements with resin.

The multi-axial reinforcement of the present invention may also be used in connection with the manufacture of sandwich type laminates. Sandwich type laminates are formed of at least one outer layer, which is arranged on a face of a thickness or core layer. Normally such laminates, though, have two outer layers arranged on both opposing faces of a core or thickness layer. The outer layer/s is/are each formed of one or more multi-axial reinforcements of the present invention arranged, optionally, in connection with one or more other reinforcing layers. Preferably, but not necessarily, the multi-axial reinforcement of the present invention acts as an infusion media introducing resin all over the area of the reinforcement to be absorbed to the optional other reinforcing layers. Such a sandwich type laminate may be used in bus, truck, trailer or boat panels. In such laminates the thickness or core layer arranged in connection with one outer layer or between the outer layers may be formed of at least one of PVC-, PE-foams and balsa. The multi-axial reinforcement of the present invention may also be used in structures where more than two reinforcing layers are needed, like for instance in floors of buses or trailers or bottoms of boats.

A further optional use may be found in laminate structures replacing the use of prior art scrims. The scrims are open network structures, which are positioned on one or both sides (top or bottom) of a stack of reinforcements in a mold. The purpose of the scrims is to allow the resin to be introduced quickly on the entire surface of the reinforcement from where the infusion of resin throughout the stack of reinforcements is supposed to take place. However, the use of scrims have a number of downsides. Firstly, the scrim has to be removed from the mold before the resin is allowed to cure, meaning manual labor, for instance. Secondly, the once used scrim cannot be used again as the resin cures in the scrim. And thirdly, a considerable amount of resin adheres to the scrim and is wasted, too. Now, by placing the biaxial reinforcement of the present invention between the layers of other reinforcements it works as a scrim, i.e. spreads the resin all over the reinforcement like the scrim does but does not have any one of the weaknesses of scrims, as it forms one of the reinforcing layers that may remain in the reinforcement. The only trade-off may be a slightly increased weight.

It is clear that the invention is not limited to the examples mentioned above but can be implemented in many other different embodiments within the scope of the inventive idea. It is also clear that the features in each embodiment described above may be used in connection with the other embodiments whenever feasible.

The invention claimed is:

1. A stitched multi-axial reinforcement for the manufacture of fiber reinforced composites by one of resin transfer molding process and vacuum infusion molding process, the stitched multi-axial reinforcement comprising:
 a first reinforcing layer of continuous unidirectional rovings having a first axial direction,
 a second reinforcing layer of continuous unidirectional rovings having a second axial direction, wherein the first axial direction is at a non-zero angle to the second axial direction; and
 a first set of mono- or bonded multifilaments between the first and the second reinforcing layers,
 stitches bonding together the first and the second reinforcing layers, and the mono- or bonded multifilaments of the first set, and
 a second set of mono- or bonded multifilaments arranged between the first and the second reinforcing layers in a direction transverse to the mono- or bonded multifilaments of the first set of mono- or bonded multifilaments, and the first set of mono- or bonded multifilaments has a diameter different than a diameter of the second set of mono- or bonded multifilaments.

2. The stitched multi-axial reinforcement as recited in claim 1, wherein the mono- or bonded multifilaments of the first set and mono- or bonded multifilaments of the second set are each transverse to at least one of the first and second axial directions.

3. The stitched multi-axial reinforcement as recited in claim 1, wherein the mono- or bonded multifilaments of the first set and mono- or bonded multifilaments of the second set are parallel with one of the first and second axial directions.

4. The stitched multi-axial reinforcement as recited in claim 1, wherein the mono- or bonded multifilaments of the second set extend from one edge of the stitched multi-axial reinforcement to an opposite edge of the stitched multi-axial reinforcement.

5. The stitched unidirectional or multi-axial reinforcement as recited in claim 1, wherein the mono- or bonded multifilaments of the first and the second set are arranged at an angle of at least five degrees to at least one of the first and the second axial directions.

6. The stitched multi-axial reinforcement as recited in claim 1, wherein the mono- or bonded multifilaments each have a diameter in a range of 50 μm to 2000 μm.

7. The stitched multi-axial reinforcement as recited in claim 1, wherein one of the first and second sets of mono- or bonded multifilaments has a diameter varying between 50 μm and 1000 μm.

8. The stitched multi-axial reinforcement as recited in claim 1, includes a third set of mono- or bonded multifilaments forming at least one of a top surface or a bottom surface of the stitched multi-axial reinforcement.

9. The stitched multi-axial reinforcement as recited in claim 1, wherein a spacing between the mono- or bonded multifilaments of each of the first and second sets is in a range of two mm to 50 mm.

10. The stitched multi-axial reinforcement as recited in claim 1, wherein the mono- or bonded multifilaments in at least one of the first and second sets have an aspect ratio of less than 2.

11. The stitched multi-axial reinforcement as recited in claim 1, wherein each of the stitches has a stitch length and that a distance or spacing between adjacent ones of the mono- or bonded multifilaments in the first set is longer than the stitch length.

12. The stitched multi-axial reinforcement as recited in claim 1, wherein the rovings of the first or second reinforcing layers are man-made or natural fibers.

13. The stitched multi-axial reinforcement as recited in claim 1, wherein the first and the second set of mono- or bonded multifilaments include resin flow passages adjacent sides of the mono- or bonded multifilaments.

14. A sandwich laminate comprising:
 a core layer, and
 at least one of the stitched multi-axial reinforcement of claim 1 arranged on a face of the core layer.

15. The sandwich laminate as recited in claim 14, wherein one of the at least one stitched multi-axial reinforcement is on a first face of the core layer and another of the at least one stitched multi-axial reinforcement is on a second face of the core layer.

16. The sandwich laminate as recited in claim 14, including an additional reinforcing layer provided in connection with the at least one stitched multi-axial reinforcements.

17. A method of producing a stitched multi-axial reinforcement for fiber reinforced composites comprising:
 a) laying continuous rovings unidirectionally side by side in a first axial direction to form a first reinforcing layer,
 b) laying a first set of mono- or bonded multifilaments on the first reinforcing layer in a direction transverse to the first axial direction of the unidirectional rovings of the first reinforcing layer,
 c) laying a second set of mono- or bonded multifilaments on the first reinforcing layer and on the first set of mono- or bonded multifilaments in a direction transverse to both the first axial direction of the mono- or bonded multifilaments of the first set and a second axial direction,
 d) laying continuous rovings unidirectionally side by side in the second axial direction on the first reinforcing layer, and on the first set and on the second set of mono- or bonded multifilaments to form a second reinforcing layer, and
 e) stitching the first and second reinforcing layers and the first set and the second set of mono- or bonded multifilaments therebetween to one another to form a multi-axial reinforcement with a top surface and a bottom surface,
 wherein steps a) through c) are repeated before performing step d) to add one or more layers to the multi-axial reinforcement.

18. The method as recited in claim 17, wherein, before step a) laying continuous rovings unidirectionally side by side in a third axial direction to form a third reinforcing layer when producing a triaxial reinforcement.

19. The method as recited in claim 18, wherein, after step d) laying continuous rovings unidirectionally side by side in a fourth axial direction to form a fourth reinforcing layer when producing a quadraxial reinforcement.

20. The method as recited in claim 17, wherein, in steps b) and c), laying the mono- or bonded multifilaments of the first set at an angle deviating at least five degrees from the first axial direction and laying the mono- or bonded multifilaments of the second set at an angle deviating at least five degrees from the second axial direction.

21. The method as recited in claim 17, steps b) and c) include laying the mono- or bonded multifilaments of the first set and the second set such that the mono- or multifilaments of at least one set are parallel with an axial direction of the reinforcing rovings of a more remote reinforcing layer.

22. The method as recited in claim 17, further comprising providing a third set of mono- or bonded multifilaments on at least one of the top and the bottom surfaces of the multi-axial reinforcement.

* * * * *